July 12, 1966   J. V. JOHNSTON   3,260,121
MOTION SENSING DEVICE

Filed May 17, 1963   2 Sheets-Sheet 1

James V. Johnston,
INVENTOR.

BY *Harry M. Saragovitz*
*Edward J. Kelly*
*Herbert Berl*
*James E. Staudt,*

July 12, 1966  J. V. JOHNSTON  3,260,121
MOTION SENSING DEVICE
Filed May 17, 1963  2 Sheets-Sheet 2

James V. Johnston,
INVENTOR.

United States Patent Office 3,260,121
Patented July 12, 1966

3,260,121
MOTION SENSING DEVICE
James V. Johnston, 821 Giles Drive NE.,
Huntsville, Ala.
Filed May 17, 1963, Ser. No. 281,369
10 Claims. (Cl. 73—505)

The invention described herein may be manufactured and used by or for the Government for governmental purposes without the payment of any royalty thereon.

This invention relates to a toroidal motion sensing device. Such a device may be used to replace a standard gyroscope in many applications.

The conventional gyroscope has a rotor shaft in a housing that is supported by a pair of gimbal rings. The bearings of these gimbals and the rotor shaft cause precessional errors which constrain the gyroscope to drift.

In view of these facts, an object of this invention is to provide a motion sensing device whose rotating mass is suspended without the use of a center support, such as a shaft.

Another object is to provide a motion sensing device with the mass of its rotor shifted from the center of its rotational path.

Another object is to provide a motion sensing device having a rotor of toroidal or doughnut shape, without any weight at the axis of rotation.

A further object is to provide a motion sensing device without solid bearings which create frictional torques.

The foregoing and other objects of this invention become more fully apparent from the following detailed description and from the accompanying drawings, in which.

Figure 1:
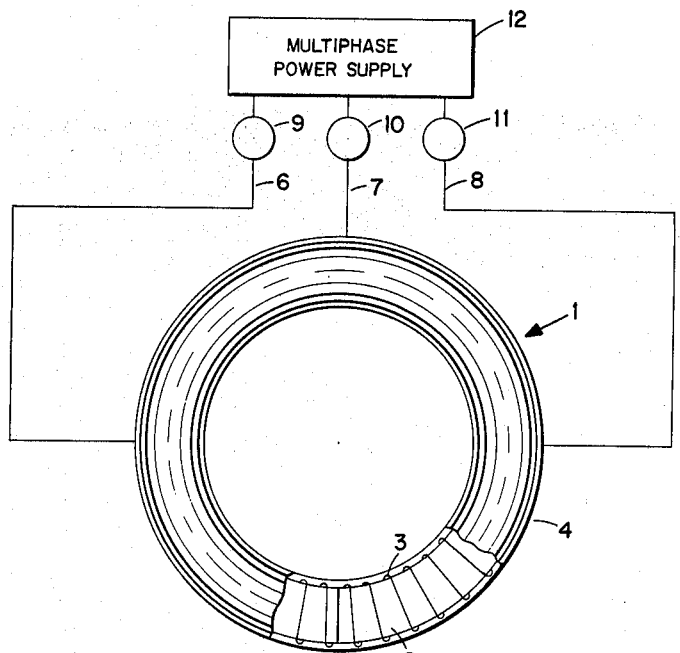
FIGURE 1 is a plan view partly broken away of one embodiment of the motion sensing device.
Figure 2:
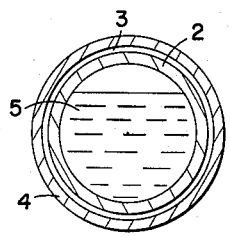
FIGURE 2 is a sectional view of the inner tube of the toroid, the tube being partially filled with a liquid at rest.

Referring now to FIGURE 1, it will be seen that the toroidal motion sensing device 1 consists of a liquid tight inner tube which forms a toric stator 2. This stator is formed of non-ferrous material such as plastic and forms an annular bore which is filled or partially filled with a conductive liquid, such as mercury, as indicated at 5 (FIGURE 2). The external portion of the stator is surrounded by a lacquer coated segmented field winding 3. This field winding is wound in three segments, each segment being connected to one of external power supply lines 6, 7 or 8. When these lines are connected to a multi-phase power supply 12, as shown, a three phase rotating flux field is formed. The field winding is not limited to three sections, but may comprise four or more. Because of the conductivity of the liquid within stator 2 the liquid will be caused to rotate at a speed equal to the speed of the rotating field. Sensing units 9, 10 and 11 are connected in series with lines 6, 7 and 8, respectively and measure the current supplied to each winding segment. A non-metallic outer tube 4 is provided for protection of the field winding and to provide a means for mounting the device in a missile or other type vehicle in which is to be utilized.

Referring now to FIGURE 2, it will be noted that the conductive liquid 5 will, because of the force of gravity, as indicated by the arrow, rest at the bottom of stator 2.

Figure 3:
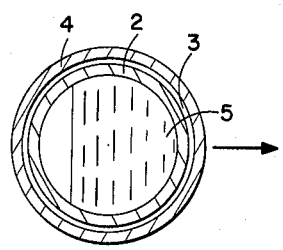
FIGURE 3 is a sectional view similar to FIGURE 2 illustrating the position taken by the liquid when in motion.

FIGURE 3 indicates the position of the liquid when rotated at operational speeds. Thus, in operation the liquid will be located in a radially outward position caused by the centrifugal force of rotation which acts in the direction of the illustrated arrows.

Figure 4:
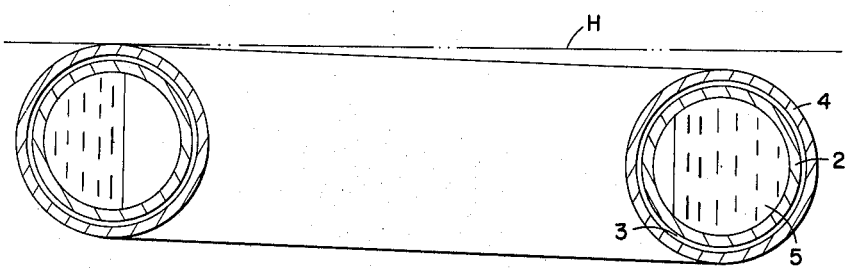
FIGURE 4 is a sectional view of the toroid in a tilted position.

When the device is operated in a horizontal position the liquid will be rotated so as to assume the position illustrated in FIGURE 3. When the device is operational and held in a horizontal position each of the three sections of field winding 3 require an equal amount of power through their respective lines 6, 7 and 8, to rotate the liquid at a predetermined speed. If, however, the toroid is tilted, for example, to the right, as illustrated in FIGURE 4, the liquid will tend to fill the low side of the toroid and empty the high side. The increased concentration of the liquid at the low side of the toroid will cause the inductive coupling of the power winding to be increased thereby increasing the current flow in the winding located at the low end and at the same time decreasing the current flow at the high side. A change in the power requirements of any of the three sections of the field windings is immediately noted by the current sensing units 9, 10 and 11.

Figure 5:
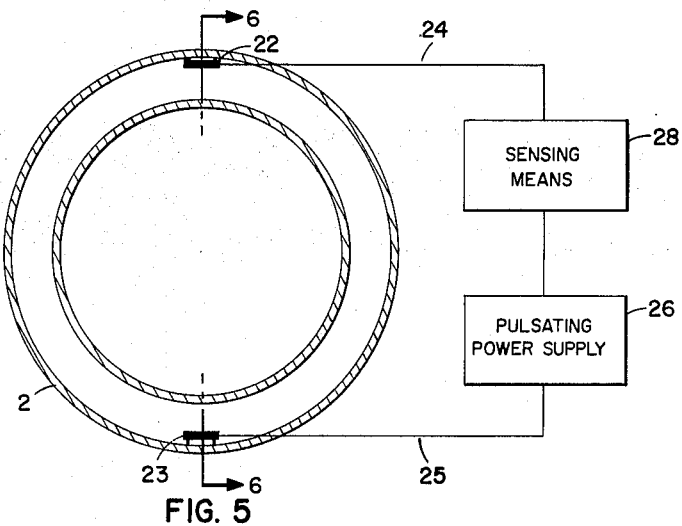
FIGURE 5 is a sectional view of the inner tube of the device and illustrating an angular movement sensing means.
Figure 6:
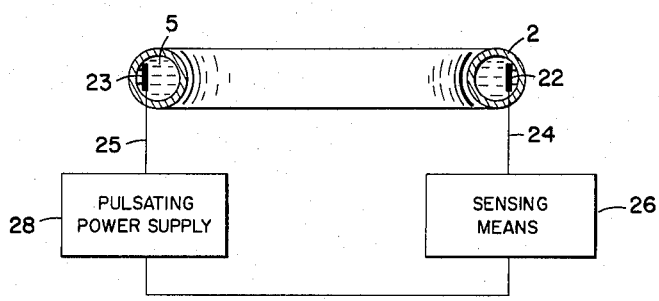
FIGURE 6 is a sectional view taken on line 6—6 of FIGURE 5.

Referring now to FIGURES 5 and 6, a pair of electrodes 22 and 23 are mounted on the inner wall of stator 2 at predetermined intervals. These electrodes are connected by means of lines 24 and 25 to a pulsating power supply means 26 and a sensing means 28 respectively. The power supply and sensing means are connected to each other to complete the circuit. The sensing means may, for example, consist of an electronic timer which measures the time required for a pulse emitted from one electrode to pass through the rotating liquid and be received by the other electrode. Thus, since electrodes 22 and 23 are rigidly attached to the stator any rotation of the stator will cause an increase or decrease in the time required for a pulse to travel from the emitter electrode to the receiver.

Thus, it will be seen that the device illustrated in FIGURES 1 through 4 will sense movement from a horizontal plane as well as acceleration, while the device illustrated in FIGURES 5 and 6 will sense rotation of the stator about a vertical axis. These modifications have been illustrated separately for purposes of simplicity; however, it is apparent that each may be incorporated in a single toroid. It is to be understood that the form of the invention that is herein shown and described is the preferred embodiment, and that various changes in the shape, size and arrangement of parts may be resorted to without departing from the spirit of the invention, or the scope of the subjoined claims.

The following invention is claimed:

1. A motion sensing device comprising: a hollow toroidal shaped inner tube, partially filled with a conductive liquid, a segmented winding surrounding said inner tube, a multiphase power supply, means connecting respective phases of said multiphase power supply to respective segments of said winding, means attached to each of said connecting means for sensing the current supplied to each segment of said winding to thereby indicate the distribution of said fluid in said tube.

2. A motion sensing device comprising, a hollow toroidal shaped tube partially filled with a conductive liquid, segmented winding means for creating a rotating field around said liquid, means to detect the current supplied to each segment of said winding to thereby indicate the distribution of said fluid in said tube.

3. A device as set forth in claim 2, wherein a pair of electrodes are mounted on the inner wall of said toroidal shaped inner tube, a predetermined distance from one another, means connecting one of said electrodes to a pulsating power supply, means for measuring the time between said pulses, means connecting the other of said electrodes to said timing means, means connecting said timing means to said pulsating power supply.

4. A motion sensing device comprising, a hollow toroidal shaped inner tube partially filled with a conductive liquid, a segmented winding surrounding said toroidal shaped inner tube, a multiphase power supply, means connecting respective phases of said multiphase power supply to resective segments of said winding, a current sensing means in series with each of said connecting means, a pair of electrodes rigidly mounted to the inner wall of said inner tube and spaced from each other, a pulsating power supply, means for timing the frequency of said pulses, means connecting one of said electrodes to said pulsating power supply means, means connecting the other of said electrodes to said timing means, means connecting said timing means to said pulsating power supply means.

5. A device as set forth in claim 4, wherein the conductive liquid is mercury.

6. A device as set forth in claim 4, wherein an outer cover surrounds said windings.

7. A motion sensing device comprising, a non-conductive hollow toroidal shaped inner tube completely filled with a conductive liquid, a series of windings surrounding said inner tube, a multiphase power supply, means connecting respective phases of said power supply to respective windings, a pair of electrodes mounted at intervals on the inner wall of said inner tube, a pulsating power supply, means for sensing the time between the pulses generated by said pulsating power supply, means connecting one of said electrodes to said pulsating power supply, means connecting the other of said electrodes to said timing means, means connecting said timing means to said pulsating power supply.

8. A device as set forth in claim 7 wherein, said conductive liquid is mercury.

9. A motion sensing device comprising, a hollow non-conductive toroidal shaped tube filled with a conductive liquid, means for providing a rotating field around said conductive liquid, means for providing an electrical pulse, means for timing the frequency of said pulse, means within said tube for emitting said pulse, means a predetermined distance from said emitting means for receiving said pulse, means connecting said emitting means to said pulse means, means connecting said receiving means to said timing means and means connecting said timing means to said pulse means.

10. A device as set forth in claim 9, wherein a conductive liquid is mercury.

No references cited.

RICHARD C. QUEISSER, *Primary Examiner.*